(12) United States Patent
Wattron et al.

(10) Patent No.: US 6,668,531 B2
(45) Date of Patent: Dec. 30, 2003

(54) HARVESTING MACHINE WITH FREEWHEEL COMPENSATION

(75) Inventors: Bernard Wattron, Haegen (FR); Martin Walch, Dettwiller (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 10/116,043

(22) Filed: Apr. 5, 2002

(65) Prior Publication Data

US 2002/0144493 A1 Oct. 10, 2002

(30) Foreign Application Priority Data

Apr. 6, 2001 (FR) .......................................... 01 04792

(51) Int. Cl.⁷ .............................................. A01D 61/00
(52) U.S. Cl. ...................... 56/16.4 R; 56/14.1; 241/222
(58) Field of Search ........................ 56/16.4 R, 16.4 B, 56/16.4 A, 16.5, 504, 14.6, 14.1, 13.9, DIG. 23, DIG. 1; 241/101.763, 101.2, 222; 24/15.4

(56) References Cited

U.S. PATENT DOCUMENTS

| 2,320,960 A | * | 6/1943 | Wheaton .................... 74/336.5 |
| 3,298,161 A | | 1/1967 | Halls et al. |
| 3,300,953 A | | 1/1967 | Glass |
| 3,473,305 A | * | 10/1969 | Cyr ............................... 56/14.5 |
| 3,523,411 A | * | 8/1970 | Waldrop et al. ............... 56/344 |
| 3,599,411 A | * | 8/1971 | Scarnato et al. .............. 56/228 |
| 3,633,345 A | | 1/1972 | Scarnato et al. |
| 3,780,506 A | * | 12/1973 | Tashiro ........................ 56/14.5 |
| 3,805,632 A | * | 4/1974 | Prokop et al. ................. 74/364 |
| 4,049,207 A | * | 9/1977 | Storm et al. .......... 241/101.762 |
| 4,127,981 A | * | 12/1978 | Parrish et al. ................ 56/14.4 |
| 5,060,462 A | | 10/1991 | Helfer et al. |
| 5,094,063 A | | 3/1992 | Wattron et al. |
| 5,107,663 A | | 4/1992 | Wattron et al. |
| 5,199,249 A | | 4/1993 | Wattron et al. |
| 5,199,250 A | | 4/1993 | Ermacora et al. |
| 5,357,737 A | | 10/1994 | Ermacora et al. |
| 5,417,042 A | | 5/1995 | Walch et al. |
| 5,423,165 A | | 6/1995 | Walch et al. |
| 5,507,136 A | | 4/1996 | Walch |
| 5,522,208 A | | 6/1996 | Wattron |
| 5,749,390 A | | 5/1998 | Ermacora et al. |
| 5,794,424 A | | 8/1998 | Ermacora et al. |
| 5,901,533 A | | 5/1999 | Ermacora et al. |
| 5,901,537 A | | 5/1999 | Walch et al. |
| 5,992,133 A | | 11/1999 | Walch et al. |
| 6,003,291 A | | 12/1999 | Ermacora et al. |
| 6,055,800 A | | 5/2000 | Walch |
| 6,085,501 A | | 7/2000 | Walch et al. |
| 6,101,796 A | | 8/2000 | Wattron et al. |
| 6,189,306 B1 | | 2/2001 | Walch |
| 6,269,619 B1 | | 8/2001 | Walch et al. |
| 6,308,504 B1 | | 10/2001 | Walch et al. |
| 6,334,292 B1 | | 1/2002 | Walch et al. |

FOREIGN PATENT DOCUMENTS

| DE | 42 11 332 C1 | 8/1993 |
| DE | 43 03 125 A1 | 8/1993 |
| DE | 43 44 585 A1 | 6/1995 |
| EP | 0 916 248 A1 | 5/1999 |

\* cited by examiner

*Primary Examiner*—Árpád Fábián Kovács
(74) *Attorney, Agent, or Firm*—Oblon, Spivak, McClelland, Maier & Neustadt, P.C.

(57) ABSTRACT

A machine for harvesting forage including in particular a cutting mechanism and a device for treating the cut products. The treatment device includes at least two ribbed rollers which are driven in rotation by a transmission. The transmission includes at least one flexible element which collaborates with a driving member and driven members which are mounted on shafts which drive the rotation of the rollers. At least one of the driven members is mounted on its shaft by a freewheel configured to transmit rotational movement from the driven member to the shaft in just one direction.

14 Claims, 4 Drawing Sheets

HARVESTING MACHINE WITH FREEWHEEL COMPENSATION

BACKGROUND OF THE INVENTION

Field of the Invention

The present invention relates to a machine for harvesting forage, comprising in particular a support frame, a cutting mechanism and a treatment device intended to treat the products cut by said cutting mechanism and comprising at least two ribbed rollers which are driven in rotation by transmission means comprising at least one flexible element which collaborates with a driving member and driven members which are mounted on shafts which drive the rotation of the rollers.

A machine such as this makes it possible to cut grass and to treat it immediately after cutting by making it pass between the two rollers with a view to accelerating its drying. During this passage between the rollers, the ribs located on their peripheries compress the grass and break up the protective husks surrounding the stems. The moisture contained in these stems then evaporates far more quickly.

DISCUSSION OF THE BACKGROUND

In a known machine of this kind, the two rollers are driven at the same rotational speed by means of transmission chains which pass over sprocket wheels. The ribs of these rollers have to mesh so as to obtain close pinches of the stems to increase the intensity of the treatment.

Nonetheless, defects in the shape of these rollers and the inevitable imperfections in the synchronization between the two rollers lead to jolting and jerking in their drive. This jolting and jerking causes overload into the transmission chains which suffer significant wear. It also causes vibration which is detrimental to the bearing structure and particularly to the guide bearings of the rollers.

SUMMARY OF THE INVENTION

It is an object of the present invention to overcome the aforementioned drawbacks of the known machine in a simple way.

To this end, a significant feature of the invention consists in the fact that at least one of the driven members of the transmission means which drive the rollers is mounted on its shaft by means of a freewheel driven in just one direction. An arrangement such as this gives the corresponding roller the ability to adapt to the other roller of its own accord. Their ribs then perform gradual and uniform meshing during rotation. That makes it possible to avoid malfunctions due to the defective shapes and defective synchronization of the rollers.

Such a freewheel may be associated with the driven member of just one roller or with the driven members of each of the two rollers. In the latter case, the rollers may compensate for the defects in shape and synchronization in both directions.

According to another feature of the invention, one of the rollers is driven at a rotational speed higher than the rotational speed of the other rotor. The rollers are then synchronized through contact of their respective ribs rather than simply through the transmission means. The latter can consist of simple elements such as belts and pulleys.

BRIEF DESCRIPTION OF THE DRAWINGS

Other features and advantages of the invention will become apparent from the description hereinafter of one nonlimiting exemplary embodiment of the invention, with reference to the appended drawings in which.

DESCRIPTION OF THE PREFERRED EMBODIMENTS

Figure 1:
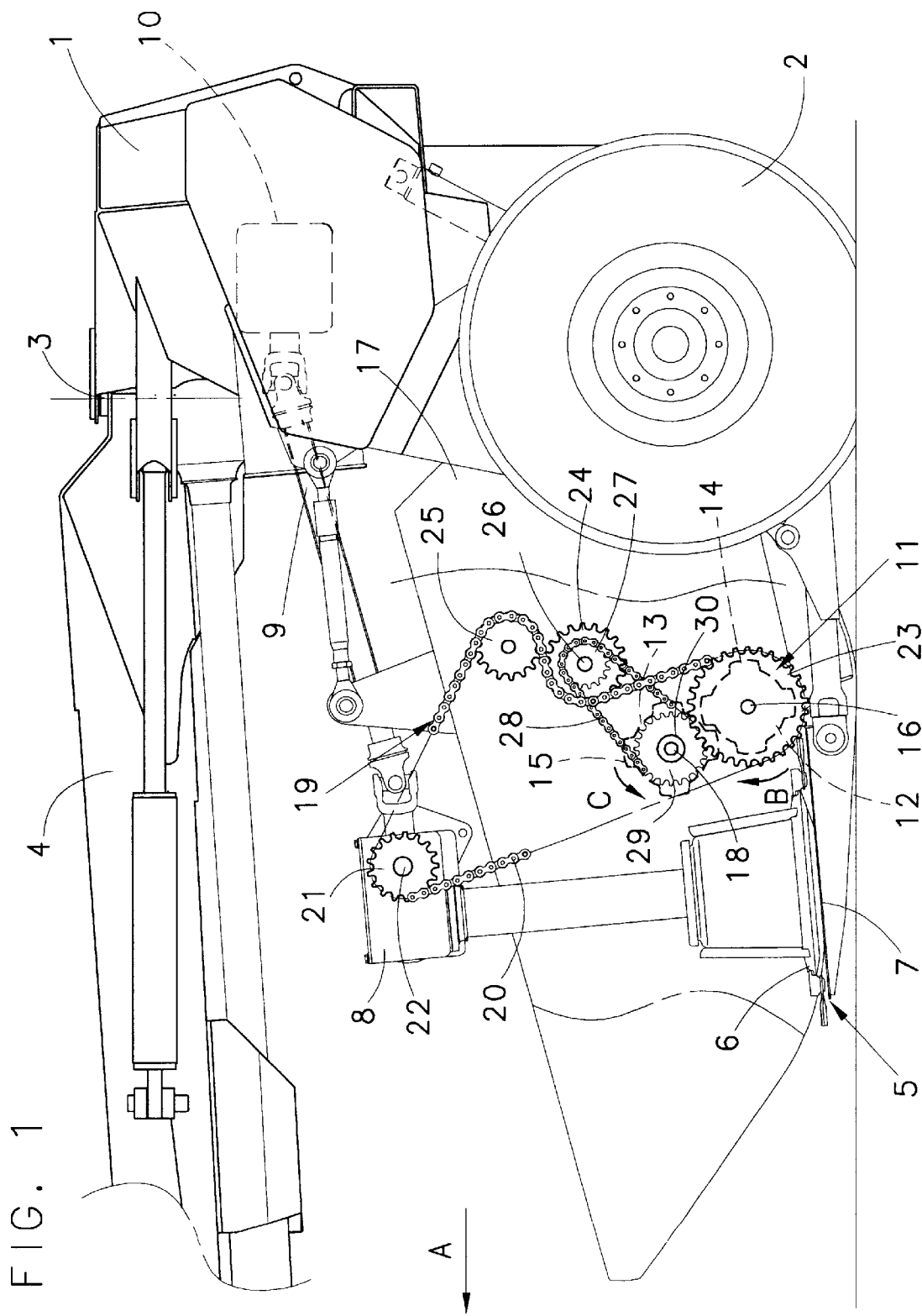
FIG. 1 depicts, in part section, a machine according to the invention.

As depicted in FIG. 1, the harvesting machine according to the invention comprises a support frame 1 in the shape of an inverted U and equipped with two support wheels 2. Articulated to this frame 1 by means of a substantially vertical axis 3 is a drawbar 4 allowing hitching to a tractor. The latter is used to drive the machine and to move it along in the direction of forward travel indicated by the arrow A. The angle made between the frame 1 and the drawbar 4 can be altered by pivoting the latter about the substantially vertical axis 3. That allows said frame 1 to be transposed into at least one transport position in which it lies in the continuation of the tractor and at least one work position in which it is laterally offset with respect to the tractor.

The frame 1 carries a cutting mechanism 5 capable of following the unevenness of the ground. This mechanism 5 is made up of a number of cutting tools such as disks 6 which carry knives and are arranged in a line substantially at right angles to the direction of forward travel A. For cutting, the disks 6 are driven in rotation about upwardly directed axes by means of a set of gears housed in a box 7 of elongate shape which lies under said disks 6. The disk 6 situated at one end of the box 7 is driven off a gearbox 8 which is itself connected by an intermediate shaft 9 to a central box 10. The drive movement may be transmitted to this central box 10 off a power take-off of the tractor by means of not depicted transmission shafts.

The frame 1 additionally carries a treatment device 11 intended to treat the products cut by the cutting mechanism 5. This device 11 is situated immediately to the rear of the disks 6. It comprises at least two ribbed rollers 12 and 13 extending horizontally across practically the entire width of the cutting mechanism 5. These rollers 12 and 13 are pressed against one another in such a way that their ribs 14 and 15 mesh. The first roller 12 comprises a shaft 16 the ends of which are guided in bearings connected to side walls 17 secured to the frame 1. The second roller 13 also comprises a shaft 18 the ends of which are housed in bearings connected to arms articulated to said side walls 17. This arrangement allows the second roller 13 to move with respect to the first roller 12 according to the volume of forage to be treated. The two rollers 12 and 13 are driven in rotation in directions converging at the front, as is indicated by the arrows B and C. This drive is provided by transmission means 19 which comprise at least one flexible element 20 which passes over a driving member 21 mounted on a shaft 22 emerging from the gearbox 8. The flexible element 20 also passes over a first and a second driven member 23 and 24 and over a member 25 that can be moved with a view to adjusting its tension. The first driven member 23 is mounted on the shaft 16 of the first roller 12. The second driven member 24 is mounted on a shaft 26 which bears a third driven member 27 over which an additional flexible element 28 passes. This additional flexible element also passes over a fourth driven member 29 which is mounted on the shaft 18 which is connected to the second roller 13.

Said additional flexible element 28 could be replaced by some other means such as a cascade of gears which provides the connection between the third driven member 27 and the fourth driven member 29. It is also possible to provide such a cascade of gears between the first roller 12 and the first driven member 23 if the latter cannot be mounted directly on the shaft 16 of said first roller 12.

Figure 3:
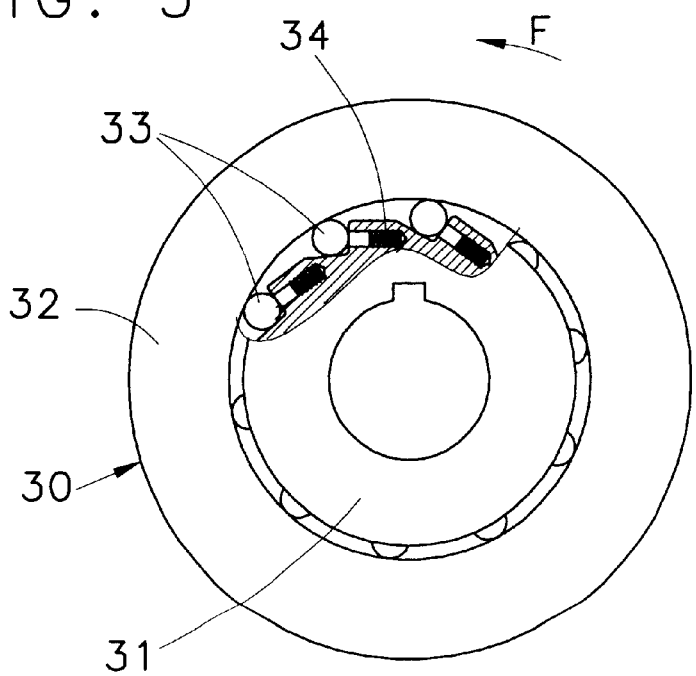
FIG. 3 depicts, in part section, one exemplary embodiment of a freewheel.

According to the invention, at least one of these driven members 23, 24, 27 or 29 is mounted on its shaft 16, 18 or 26 by means of a freewheel 30 driven in just one direction. This arrangement makes it possible automatically to correct for faults in shape and synchronization of the rollers 12 and 13 so as to avoid the vibrations these could generate. As is apparent from the example depicted in FIG. 3, the freewheel 30 is made up, in way known per se, in particular, of an inner ring 31 which is secured to the shaft on which it is mounted, and of an outer ring 32 on which the corresponding driven member is mounted. Housed between the two rings 31 and 32 are cylindrical drivers 33 pushed outward by springs 34. These drivers 33 wedge themselves between said rings 31 and 32 and transmit the rotational movement of the outer ring 32 to the inner ring 31 when it turns in the direction of the arrow F. By contrast, the cylindrical drivers 33 unwedge themselves when the direction of rotation of the outer ring 32 is reversed or when the inner ring 31 is turning more quickly than the outer ring 32. In another exemplary set-up, the movement may also be transmitted from the inner ring 31 to the outer ring 32. For that, the direction of rotation has to be the opposite of that indicated by the arrow F or, alternatively, the position of the freewheel 30 has to be reversed.

Figure 4:
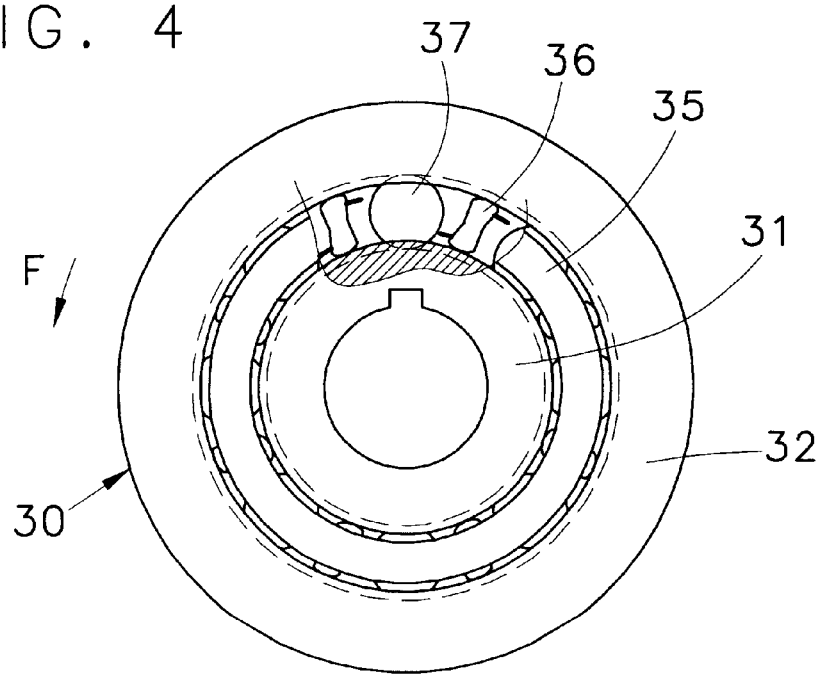
FIG. 4 depicts another exemplary embodiment of a freewheel.

In the alternative form of FIG. 4, the freewheel 30 comprises, between the inner ring 31 and the outer ring 32, a cage 35 with an alternation of cams 36 and balls 37. As depicted, the cams 36 transmit the rotational movement from the outer ring 32 to the inner ring 31 by friction when the assembly is turning in the direction of the arrow F. The inner ring 31 can, however, rotate more quickly than the outer ring 32 without that having any influence on the latter. The balls 37 center and guide the rings 31 and 32 when one is turning with respect to the other.

In the exemplary embodiment according to FIG. 1, the freewheel 30 is situated between the shaft 18 of the second roller 13 and the driven member 29. This second roller 13 is thus driven in the direction of the arrow C by the freewheel 30. The ratio between the driven members 23, 24, 27 and 29 which turn the two rollers 12 and 13 may be such that these rollers normally rotate at the same speed. The second roller 13 nevertheless has the possibility, by virtue of the freewheel 30, of rotating more quickly than the first roller 12 when one of its ribs 15 bumps against a rib 14 of said first roller 12. That allows the second roller 13 to adjust itself with respect to the first roller 12 so as to obtain correct meshing of the ribs 14 and 15.

According to alternative forms of the embodiment according to FIG. 1, the freewheel 30 may also be mounted between the second driven member 24 or the third driven member 27 and the shaft 26 on which they are mounted.

Figure 2:
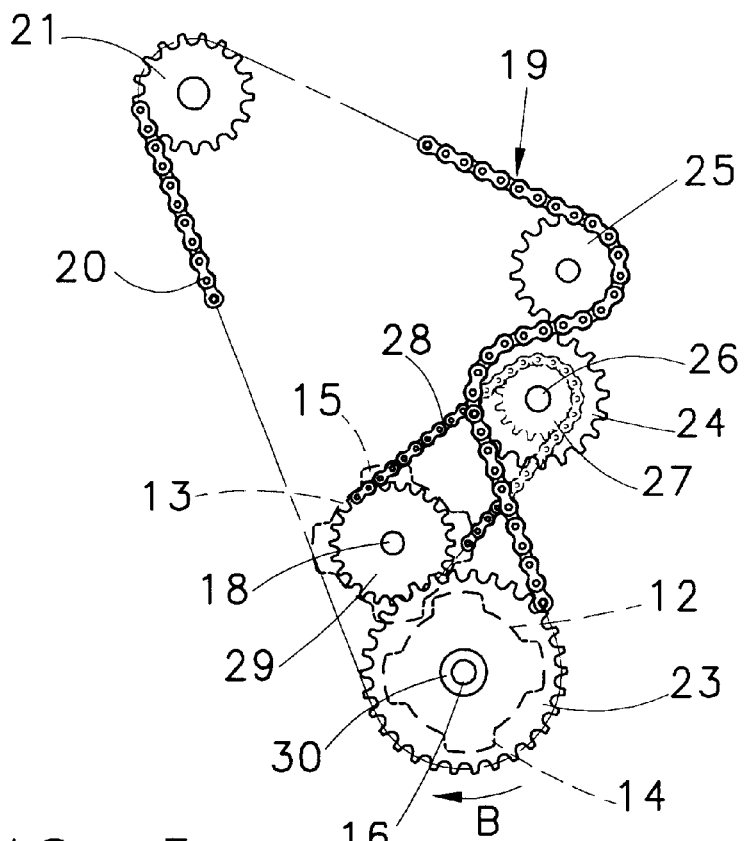
FIG. 2 depicts a detail view of another exemplary embodiment of the transmission means.

In the exemplary embodiment depicted in FIG. 2, the first driven member 23 is mounted by means of a freewheel 30 on the shaft 16 of the first roller 12. The two rollers 12 and 13 can then be driven in opposite directions at identical speeds. The first roller 12 may nonetheless rotate more quickly than the second roller 13 by virtue of the freewheel 30. That also allows its ribs 14 to adjust themselves with respect to those of said second roller 13 when they become offset.

Figure 5:
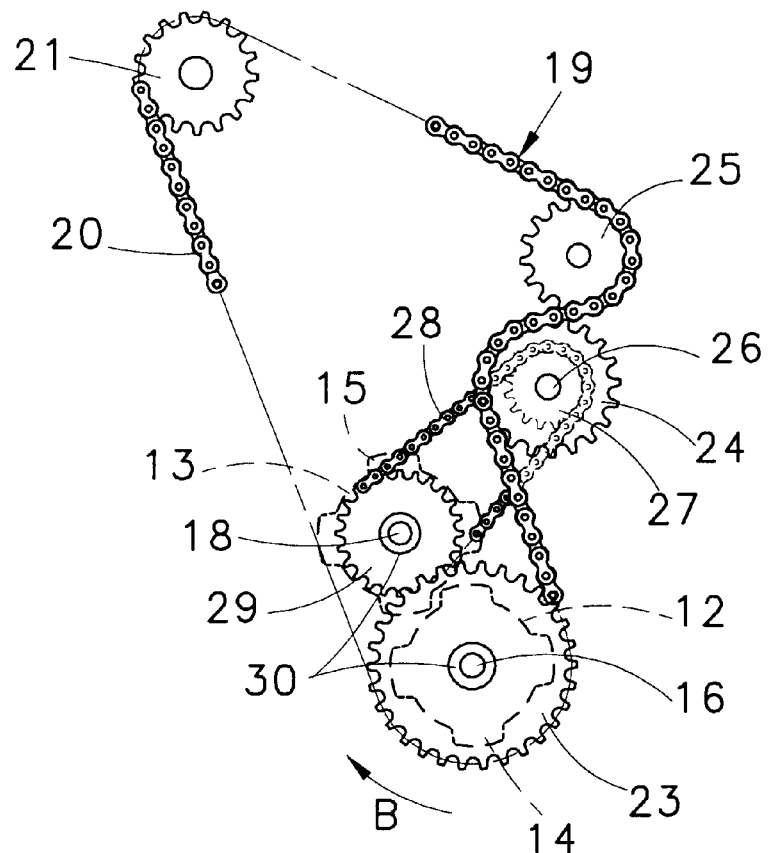
FIG. 5 depicts a detail view of another exemplary embodiment of the transmission means.

In the example according to FIG. 5, the first driven member 23 is mounted by means of a freewheel 30 on the shaft 16 of the first roller 12 and the fourth driven member 29 is also mounted by means of a freewheel 30 on the shaft 18 of the second roller 13. In this case, the two rollers 12 and 13 can be driven in opposite directions at substantially identical speeds. Nonetheless, each can accelerate its speed so that its ribs 14 or 15 can adjust themselves to those of the other roller with a view to perfecting their meshing. It is also possible for the freewheel 30 to be associated with the second driven member 24 or with the third driven member 27 rather than with the fourth driven member 29. In each of these cases, the two rollers 12 and 13 can accelerate their rotational speed to avoid vibration.

The rollers 12 and 13 of the example according to FIG. 5 may be driven such that the rotational speed at which the transmission means 19 drive the first roller 12 exceeds the speed at which they drive the second roller 13. In consequence, the second roller 13 is essentially driven by the first roller 12. Their ribs 14 and 15 constantly adjust with respect to each other, favouring their mesh and allowing vibration-free and jolt-free operation. A reverse set-up in which the drive speed of the second roller 13 exceeds that of the first roller 12 is just as possible.

The flexible elements 20 and 28 of the transmission means 19 may, for example, consist of chains. The driving member 21 and the driven members 23, 24, 27 and 29 then consist of sprocket wheels over which said chains pass. The ratio between the number of teeth on these driven sprocket wheels 23, 24, 27 and 29 may be such that the two rollers 12 and 13 are driven at the same speed.

In the case where, as was previously described, one of the rollers 12 or 13 is driven at a higher speed than the other, it is possible to alter the ratio between the number of teeth on the first driven member 23 and that of the other driven members 24, 27 or 29. Thus, if, for example, the number of teeth on the second driven member 24 is increased, then the speed at which the second roller 13 is driven will be lower than that of the first roller 12.

Figure 6:
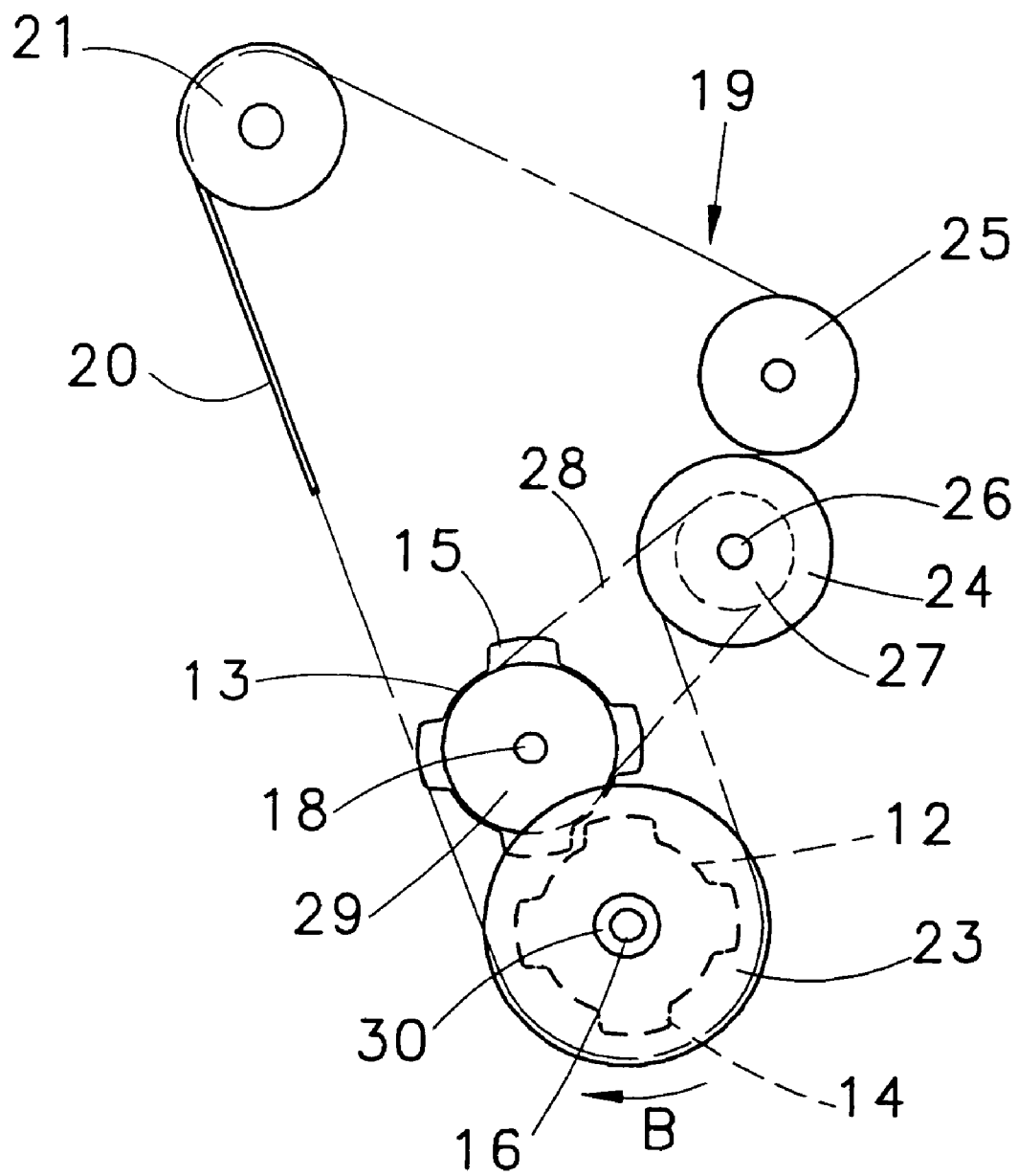
FIG. 6 depicts a detail view of another exemplary embodiment of the transmission means.

The use of a freewheel 30 for driving each roller 12 and 13 allows each to adapt itself to suit the rotational speed of the other. It is thus possible to dispense with the synchronous drive between the two rollers 12 and 13. The flexible elements 20 and 28 may then consist of belts while the driving member 21 and the driven members 23, 24, 27 and 29 may consist of simple pulleys as shown in FIG. 6. This belt and pulley drive is lower in cost than a chain and sprocket drive.

During operation, the machine is placed in a lateral position and moved along in the direction A by means of the tractor. The cutting mechanism 5 is lowered so that it follows the surface of the ground. The disks 6 are driven in rotation and cut the grass in front of the machine. This grass passes immediately between the rollers 12 and 13 which are driven in rotation by the transmission means 19 so that they turn in the direction of the arrows B and C. In the example of FIG. 1 and in the alternative forms described, the flexible element 20 drives the first roller 12 via the driven member 23. It also drives the second driven member 24 which drives the shaft 26 and the third driven member 27. The latter transmits the movement to the fourth driven member 29 and to the second roller 13 via the additional flexible element 28. By virtue of their ribs 14 and 15, the two rollers 12 and 13 compress the grass and break down the protective husks surrounding the stems. This forage then drops down onto the ground and dries rapidly because the moisture is let out through the openings created in the protective husks.

Should the ribs 14 and 15 of the two rollers 12 and 13 become slightly offset from one another, the second roller 13 can rotate more quickly by virtue of the freewheel 30. Its ribs 15 can then adjust themselves to those of the first roller 12 so as to improve their mesh. That makes it possible to avoid the vibrations and impacts which ribs 14 and 15 which meet could cause.

In the exemplary embodiment according to FIG. 2, the freewheel 30 allows the ribs 14 of the first roller 12 to adjust according to those of the second roller 13 with a view to avoiding impacts and vibrations.

In the exemplary embodiment according to FIG. 5, the two rollers 12 and 13 constantly adjust with respect to each other by virtue of their freewheels 30 to allow the ribs 14 and 15 to mesh correctly.

In the case where one of the rollers 12 or 13 is driven at a higher speed than the other, the one which is rotating the more quickly drives the other via the ribs 14 and 15 which then constantly adjust themselves.

It is clearly evident that the invention is not restricted to the embodiments described hereinabove and depicted in the appended drawings. Modifications remain possible, particularly as regards the construction or number of the various elements or by substituting technical equivalents without thereby departing from the scope of protection.

What is claimed as new and desired to be secured by Letters Patent of the United States is:

1. A machine for harvesting forage, comprising
   a support frame;
   a cutting mechanism; and
   a treatment device to treat products cut by said cutting mechanism and comprising at least first and second ribbed rollers which are driven in rotation by a transmission comprising at least one flexible element which collaborates with a driving member and driven members which are mounted on shafts which drive the rotation of the at least first and second rollers,
   wherein at least one of the driven members is mounted on its shaft by a freewheel and said freewheel is configured to transmit rotational movement from the respective driven member to the corresponding shaft in just one direction.

2. The machine as claimed in claim 1, wherein the transmission includes a flexible element which passes over the driving member and over at least one first driven member which is secured to a shaft connected to the first roller and over a second driven member which is mounted on a shaft carrying a third driven member over which there passes an additional flexible element which also passes over a fourth driven member which is mounted on a shaft connected to the second roller, at least one of said second, third or fourth driven members being mounted on the corresponding shaft by the freewheel.

3. The machine as claimed in claim 1, wherein the transmission includes a flexible element which passes over the driving member and over at least one first driven member which is mounted by the freewheel on a shaft which is connected to the first roller and over a second driven member which is mounted on a shaft carrying a third driven member over which there passes an additional flexible element which also passes over a fourth driven member which is secured to a shaft connected to the second roller.

4. The machine as claimed in claim 1, wherein the transmission includes a flexible element which passes over the driving member and over at least one first driven member which is mounted by the freewheel on a shaft which is connected to the first roller and over a second driven member which is mounted on a shaft carrying a third driven member over which there passes an additional flexible element which also passes over a fourth driven member which is mounted on a shaft connected to the second roller, at least one of said second, third or fourth driven members being mounted on the corresponding shaft by means of another freewheel and said another freewheel is configured to transmit rotational movement from the respective driven member to the corresponding shaft in just one direction.

5. The machine as claimed in claim 4, wherein the rotational speed at which the transmission drives the first roller is greater than the speed at which the transmission drives the second roller.

6. The machine as claimed in claim 4, wherein the freewheel and the another freewheel include drive parts which are active in one direction of rotation and which retract in an opposite direction of rotation.

7. The machine as claimed in claim 4, wherein the freewheel and the another freewheel include drive parts which are active in one direction of rotation and retract in an opposite direction and which are combined with rolling balls.

8. The machine as claimed in claim 1, wherein the transmission includes flexible elements that include chains and driving and driven members that include sprocket wheels.

9. The machine as claimed in claim 1, wherein the transmission includes flexible elements that include belts and driving and driven members that include pulleys.

10. A machine for harvesting forage, comprising:
    cutting means for cutting forage product;
    product treating means for treating products cut by said cutting means and comprising transmission means for transmission comprising at least one flexible element which collaborates with a driving means for driving and driven means for being driven which are mounted on shafts which drive the rotation of at least a first and second roller; and
    supporting means for supporting said cutting means and said product treating means,
    wherein at least one of the driven means includes a rotational movement transmitting means for transmitting rotational movement in just one direction.

11. The machine as claimed in claim 10, wherein the transmission means includes another rotational movement transmitting means for transmitting rotational movement in just one direction.

12. The machine as claimed in claim 11, wherein the rotational speed at which the transmission means drives the first roller is greater than the speed at which the transmission means drives the second roller.

13. The machine as claimed in claim 11, wherein the rotational movement transmitting means and the another rotational movement transmitting means include drive parts which are active in one direction of rotation and which retract in an opposite direction of rotation.

14. The machine as claimed in claim 11, wherein the rotational movement transmitting means and the another rotational movement transmitting means include drive parts which are active in one direction of rotation and retract in an opposite direction and which are combined with rolling balls.

* * * * *